United States Patent [19]

Shah

[11] Patent Number: 5,737,934
[45] Date of Patent: Apr. 14, 1998

[54] THERMAL COMFORT CONTROLLER

[75] Inventor: Dipak J. Shah, Eden Prairie, Minn.

[73] Assignee: Honeywell Inc., Minneapolis, Minn.

[21] Appl. No.: 664,012

[22] Filed: Jun. 12, 1996

[51] Int. Cl.$^6$ .................... F25B 49/00; B01F 3/02
[52] U.S. Cl. .................. 62/176.6; 105/223; 236/44 R
[58] Field of Search .................. 62/176.6; 165/222, 165/223; 236/44 R, 44 F, 44 C

[56] References Cited

U.S. PATENT DOCUMENTS

| | | | |
|---|---|---|---|
| 4,873,649 | 10/1989 | Grald et al. | 62/176.6 X |
| 5,346,129 | 9/1994 | Shah et al. | 165/223 X |

FOREIGN PATENT DOCUMENTS

| | | | |
|---|---|---|---|
| 0146347 | 11/1980 | Japan | 62/176.6 |
| 60117041 | 6/1985 | Japan | 62/176.6 |

Primary Examiner—William E. Wayner
Attorney, Agent, or Firm—Ian MacKinnon

[57] ABSTRACT

A controller for a climate control system has a relative humidity sensor as well as a dry-bulb temperature sensor within the enclosure. The humidity value is used in conjunction with the dry-bulb temperature to generate an apparent temperature error signal which is a function of both the dry-bulb temperature and the relative humidity values. This permits robust control of both enclosure temperature and enclosure moisture content without abnormal cycling of the climate control system. Instead of using a sensor which directly measures the apparent temperature, the apparent temperature can be synthesized from the relative humidity and dry-bulb temperature within the enclosure. Alternately, the sensed and set point apparent temperature values can be synthesized from any two thermodynamic properties of the moist air within the enclosure.

24 Claims, 6 Drawing Sheets

GENERAL HEAT STRESS INDEX

| DANGER CATEGORY | APPARENT TEMPERATURE (°F) | HEAT SYNDROME |
|---|---|---|
| IV. EXTREME DANGER | GREATER THAN 130° | HEATSROKE OR SUNSTROKE IMMINENT |
| III. DANGER | 106°-130° | SUNSTROKE, HEAT CRAMPS, OR HEAT EXHAUSTION LIKELY. HEATSTROCK POSSIBLE WITH PROLONGED EXPOSURE AND PHYICAL ACTIVITY. |
| II. EXTREME CAUTION | 90°-105° | SUNSTROKE, HEAT CRAMPS AND HEAT EXHAUSTION POSSIBLE WITH PROLONGED EXPOSURE AND PHYSICAL ACTIVITY. |
| I. CAUTION | 80°-90° | FATIGUE POSSIBLE WITH PROLONGED EXPOSURE AND PHYSICAL ACTIVITY. |

NOTE: DEGREE OF HEAT STRESS MAY VARY WITH AGE, HEALTH, AND BODY CHARACTERISTICS.

Fig. 5b

THERMAL COMFORT CONTROLLER

BACKGROUND OF THE INVENTION

This invention is directed generally to control of indoor climate modifying apparatus such as an air conditioning unit for maintaining thermal comfort for the occupants of enclosures. The more important application is in controlling operation of a mechanical cooling device such as an air conditioner, heat pump operating in the cooling mode, etc., and therefore the discussion and disclosure following will be based primarily on the air conditioning case. The invention will typically be implemented in an electronic thermostat which uses a microcontroller in conjunction with a temperature sensor and a relative humidity sensor for controlling opening and closing of a solid state switch which controls the flow of operating current to the air conditioning control module.

Thermostats typically in use now which direct operation of air conditioners use dry-bulb temperature as the controlled variable. By the term "dry-bulb temperature" is meant the actual temperature of the air as measured by a typical temperature sensor, and the use of the term "temperature" or "air temperature" hereafter will refer to dry-bulb temperature unless the context clearly directs otherwise. It is easy to measure air temperature and this measurement is already available in most thermostats. A typical thermostat in air conditioning mode causes the air conditioner to begin operating when temperature rises above a set point value. The air conditioner responds by injecting cold air into the enclosure until the temperature within the enclosure has fallen to a point below the set point value. The typical thermostat uses an anticipation element so as to turn on the air conditioner before the actual set point is reached. For many situations this type of control results in air which is comfortable for the enclosure's occupants.

It is well known that an air conditioner removes water from the air as well as cools it. The mechanism by which water is removed involves passing air from the enclosure and/or from the outside through the air conditioner, reducing the temperature of this air to substantially less than the comfort range of 70°–74° F. In order to remove water from the air, the temperature of at least some of it must be lowered to less than its dew point temperature, the temperature at which water condenses from the air. Some of the water in the conditioned air condenses on the cooling coil (evaporator) of the air conditioner in this process and drips off the coils to a pan below, from which it drains. Because air will not release any of its water until it has reached 100% relative humidity, i.e., its dew point temperature, it is necessary for at least the air adjacent the cooled surfaces of the heat exchanger to reach this temperature. The total air stream through the cooling coil however, may not reach 100% relative humidity because not all of the air is cooled to its dew point. The relatively cold and dry conditioned air (relatively dry even though it has nearly 100% relative humidity) is mixed with the uncomfortably warm and humid air within the enclosure to achieve a more acceptable 40–60% relative humidity at a comfortable temperature of 70°–74° F. as well controlled by the thermostat.

Normally this procedure results in air within the enclosure whose temperature and humidity is within the thermal comfort range. (Note that the term "humidity" is used to mean the actual moisture content of the air, and the use of the term "humidity" hereafter will refer to the actual moisture content of the air unless the context clearly directs otherwise.) However, there are situations that can result in air having humidity which is still too high when the temperature requirement has been met. To achieve air at comfortable levels of both temperature and humidity, an air conditioner is sized for the expected load which the enclosure will present so that when the set point temperature is reached, humidity is acceptable. But in cases of unusually high humidity or where the air conditioner capacity relative to the current environmental conditions does not result in sufficient dehumidification when the set point temperature is reached, it is possible for the air in the enclosure to have excessive humidity.

It seems to be a simple solution to control the relative humidity in the enclosure by simply adding a relative humidity sensor to the thermostat, and then controlling the air conditioner to maintain relative humidity within a selected set point range. A problem with this approach is that the relative humidity of the enclosure air will actually rise as the air is cooled and dehumidified within the enclosure. This possibility arises because the relative humidity is a function of both the amount of water vapor in a given volume or mass of air and its dry-bulb temperature. Relative humidity for any volume of air is defined as the ratio of the partial pressure of the water vapor in the air to the vapor pressure of saturated stem at that temperature. Since the vapor pressure of saturated steam drops rapidly with temperature, a relatively small mount of water vapor in a volume of air at a lower temperature can result in 100% relative humidity. It is thus possible to have a runaway situation where the relative humidity control function in the thermostat continues to call for further dehumidification, and as the temperature within the enclosure falls, relative humidity rises and locks the air conditioner on.

U.S. Pat. No. 4,105,063 (Bergt) is related art which discloses an air conditioning system which controls the dew-point temperature of enclosure air independently of the dry-bulb temperature. Bergt provides a sensor responsive to absolute moisture content which operates in parallel with the normal dry-bulb temperature control. Because of the parallel operation of the two control functions, undesirable short cycles are possible. This over-cycling problem is solved by the present invention. Bergt's invention may also require re-heat which reduces the efficiency of the process.

U.S. Pat. No. 4,889,280 (Grald and MacArthur) is related art disclosing an auctioneering controller wherein the predetermined dry-bulb temperature set point is modified in response to a absolute humidity error signal. The enclosure temperature which results may not always be comfortable, and there is also a potential for over-cycling.

U.S. Pat. No. 5,346,129 issued to this inventor and hereby incorporated by reference discloses a controller for a climate control system which has a relative humidity sensor as well as a dry-bulb temperature sensor within the enclosure. The relative humidity and dry-bulb temperature are used to determine a humidity (dew point or wet-bulb) temperature. The humidity temperature value is used in conjunction with the dry-bulb temperature to generate a single error signal which is a function of both the dry-bulb and the humidity temperature values. This permits control of both enclosure temperature and enclosure humidity without abnormal cycling of the climate control system. The system as disclosed in U.S. Pat. No. 5,346,129 bases the error value ($e_H$) on a function of the humidity temperature error and the dry bulb temperature error. The present invention is an improvement upon this earlier invention wherein the error value ($e_{ap}$) is a function of apparent temperature.

BRIEF DESCRIPTION OF THE INVENTION

These and other shortcomings of the referenced patents are solved by the present invention which computes an error value as a function of apparent temperature. This error value is then used as the input to a control algorithm used by a controller for a climate control system to determine the times during which to activate the climate control system for modifying the temperature and humidity of air within an enclosure.

Such a controller includes a relative humidity sensor providing a relative humidity signal encoding the relative humidity value and a temperature sensor providing an air temperature signal encoding the dry-bulb temperature value. These values are converted to an apparent temperature value. A memory records a dry-bulb temperature set point value and a relative humidity set point value. The dry bulb set point value and the relative humidity set point value are converted to an apparent temperature set point value. In an alternate implementation of this invention, the apparent temperature set point value may be directly input by the occupant of the conditioned space. A comparison means receives the apparent temperature value and the apparent temperature set point value and computes an error value, and issues a demand signal responsive to a predetermined range of error values. In a typical arrangement, the demand signal is supplied to the climate control system. While the demand signal is present, the climate control system operates to reduce the error value by cooling the enclosure air and decreasing or increasing its temperature and humidity so as to shift the enclosure's apparent temperature closer to the set point value.

It should be noted that the term "apparent temperature" is more commonly known as the "heat index" and is the effective or the apparent temperature resulting from the combined effect of both the dry-bulb temperature of the air and the moisture content of that air. For the purposes of this invention, the term "apparent temperature" shall encompass both the "heat index" and the "apparent temperature".

DESCRIPTION OF THE PREFERRED EMBODIMENT

Figure 1:
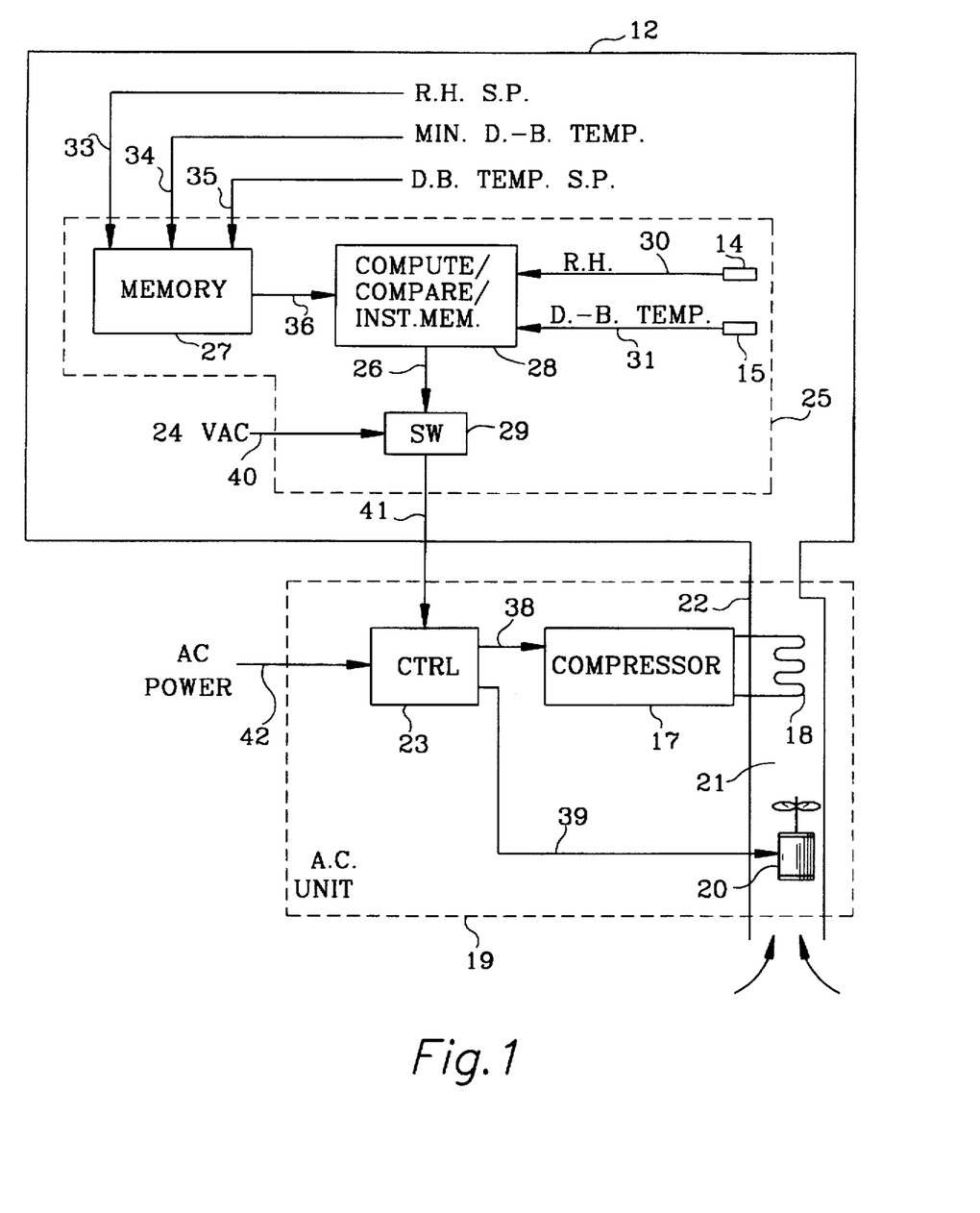
FIG. 1 is a block diagram Of complete air conditioning installation employing the invention.

In FIG. 1, the invention is shown implemented in a controller 25 for an air conditioning installation. An enclosure 12 receives cooled and dehumidified air from a conventional air conditioning unit 19 which operates on eternally supplied AC power provided on conductors 42. A control element 23 switches power to a compressor 17 and a blower 20 on conductors 38 and 39 respectively, thereby providing sequencing as needed for their operation. Compressor 17 provides liquid coolant to expander coil 18 which is located in a heat exchanger plenum 21 along with the blower 20. The air conditioning unit 19 operates while a demand signal is present on path 26. The demand signal on path 26 closes switch 29, allowing control current supplied by a 24 VAC source on path 40 to flow to the air conditioning unit controller 23 on path 41. While air conditioning unit 19 is operating, fan 20 forces air across coil 18 to cool and dehumidify the air. This conditioned air flows into enclosure 12 through duct 22 to reduce both the temperature and humidity of the air within enclosure 12. The demand signal on path 26 is provided by a controller 25 whose functions occur within electronic circuitry. We expect that controller 25 will typically be attached to a wall of enclosure 12 in the manner done for conventional thermostats.

Controller 25 includes a memory unit 27 which can store digital data and a processor unit 28 which can perform computation and comparison operations on data supplied to it from both memory 27 and from external sources, and which also includes an instruction memory element. We prefer to use a conventional microcontroller to function as memory 27 and processor 28. Controller 25 further comprises a relative humidity sensor 14 located within enclosure 12 and which provides a relative humidity signal on path 30 which is shown as encoding the relative humidity of the air within enclosure 12. A temperature sensor 15 also located within enclosure 12 similarly encodes a dry-bulb temperature value in an air temperature signal on path 31. Processor 28 receives these temperature signals and converts them to digital values for internal operations.

Paths 33–35 carry signals to memory 27 encoding various set point values for implementing this invention. Typically the signals on paths 33–35 are provided by the person responsible for controlling the climate of enclosure 12. If this person is an occupant of enclosure 12, the set point values may be selected by simply shifting control levers or dials carried on the exterior of controller 25. The values may also be selected by a keypad which provides digital values for the set points in the signals on paths 33–35. The occupant of enclosure 12, in an alternative design, may enter the desired apparent temperature. In this case memory 27 will record this setpoint value. It should be noted that apparent temperature is more commonly referred to as the "heat index" and for the purposes of this application, apparent temperature shall encompass both definitions to any extent they differ. Path 33 carries a relative humidity signal encoding a relative humidity set point value representative of the desired relative humidity within the enclosure 12. Path 34 is optional in the preferred embodiment and carries to memory 27 a signal encoding an externally provided minimum air (dry-bulb) temperature set point value which serves as a limit value for dry bulb temperature. Path 35 carries a signal encoding an air (dry-bulb) temperature set point value. Memory 27 records these three set point values, and encodes them in a set point signal carried to processor 28 on path 36. If memory 27 and processor 28 are formed of a conventional microcontroller, the procedures by which these set point values are provided to processor 28 when needed are included in further circuitry not shown which provides a conventional control function for the overall operation of such a microcontroller.

Figure 2:
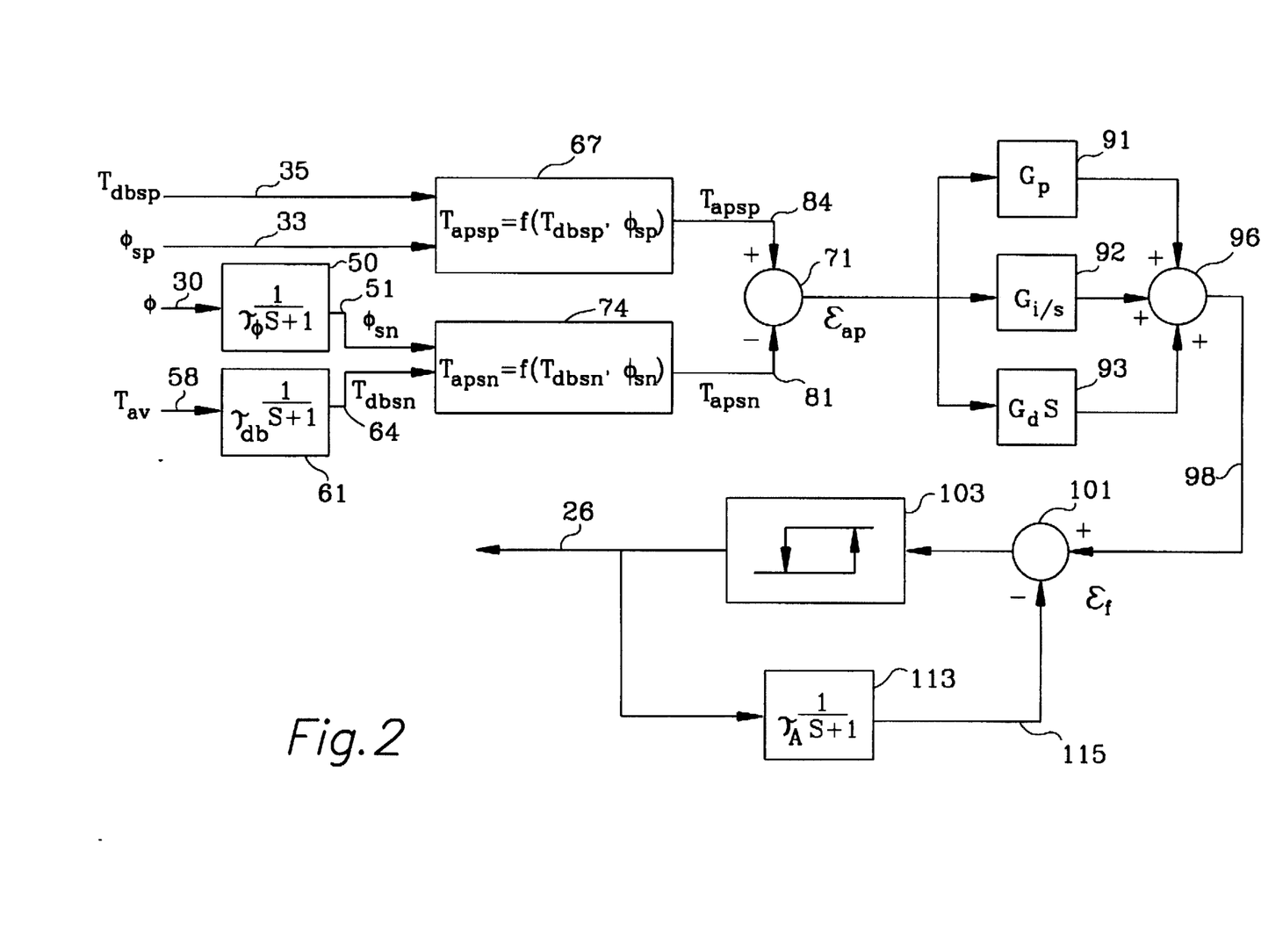
FIG. 2 is a computation diagram specifying a preferred embodiment of the algorithm implemented by a controller for a climate control system.

While the structure of controller 25 as shown in FIG. 1 is completely correct, it is incomplete in that there is no description of the operations which the microcontroller performs in implementing the invention. Processor unit 28 has internal to it, a read-only memory (ROM) in which are pre-stored a sequence of instructions which are executed by processor unit 28. The execution of these instructions results in processor unit 28 performing the functions shown in detail by the functional block diagram of FIG. 2. FIG. 2 is much more useful to the reader than is FIG. 1 in understanding both the invention itself as well as the structure which a preferred embodiment has. The reader should understand that FIG. 2 represents and explains modifications to the hardware broadly shown in FIG. 1, which modifications allow processor unit 28 to implement our invention. We wish to emphasize that each element of FIG. 2 has an actual physical embodiment within processor unit 28. This physical embodiment arises from the actual physical presence of structure within processor unit 28 which provide the functions of the various elements and data paths shown in FIG. 2. The execution of each instruction causes the processor unit 28 to physically become part of an element shown in FIG. 2 while the instruction is executed. The ROM within processor unit 28 also forms a part of each of the functional blocks in FIG. 2 by virtue of it storing and supplying the instructions which cause the creation of the functional blocks. There are also arithmetic operation registers within processor unit 28 which temporarily store the results of computations. These can be considered to form a part of memory 27 even though perhaps physically located within the processor unit portion of the microcontroller.

Signal transmissions are represented in FIG. 2 by lines originating from one functional block and terminating at another as shown by the arrow. This implies that signals created by one function element are supplied to another for use. Within a microcontroller, this occurs when a series of instructions whose execution causes the microcontroller to comprise one functional element, actually produces digital values which are then transmitted within the microcontroller on its signal paths for use by the circuitry when executing instructions for another functional element. It is entirely possible that the same physical signal paths within a microcontroller will carry many different signals each whose paths are shown individually in FIG. 2. In fact, one can think of a single such physical path as being time shared by the various functional blocks. That is, such an internal path of a microcontroller may at different times, perhaps only microseconds apart, serve as any one of the various paths shown in FIG. 2.

At this point, it is helpful to supply a legend which tabularly defines each value encoded in the signals shown in FIG. 2:

$T_{av}$—Weighted average temperature of enclosure 12

$\phi$—Enclosure 12 relative humidity $T_{dbsn}$—Sensor-derived dry-bulb temperature of the air in enclosure 12 with lag corrections $T_{apsp}$—Apparent temperature set point for enclosure 12 either derived from $T_{dbsp}$ and $\phi_{sp}$, or specified by the occupant in an alternative implementation $T_{apsn}$—Derived apparent temperature of the air in enclosure 12 based upon $T_{dbsn}$ and $\phi_{sn}$ $T_{dbsp}$—Dry-bulb temperature set point for enclosure 12

$\phi_{sp}$—Relative humidity set point for enclosure 12

$\phi_{sn}$—Sensor-derived relative humidity in enclosure 12 with lag corrections $\epsilon_{ap}$—Apparent temperature error $T_{dbmn}$—Minimum allowable value for $T_{dbsn}$ $\epsilon_f$—Final error value provided by P-I-D function In FIG. 2, the individual functional blocks have internal labels which describe the individual functions which each represent. Established conventions are followed in FIG. 2 to represent the various functions which comprise the invention. Each rectangular block, say block 61, represents some type of mathematical or computational operation on the value encoded in the signal supplied to the block. Thus, the signal on path 58, which encodes the average room temperature $T_{av}$, is shown supplied to functional block 61, to collectively represent apparatus which forms a Laplace operator transform on $T_{av}$. Other functional blocks represent decision operations, calculation of other mathematical functions, such as multiplication, and other Laplace transform operations of various types. Circles to which are supplied two or more signals imply a sum or difference calculation as indicated by the adjacent plus or minus sign. Thus the plus and minus signs adjacent the junctions of paths 84 and 81 with summation element 71 implies subtraction of the value encoded in the signal on paths 81 from the value encoded on path 84.

The various calculations, operations, and decisions represented by FIG. 2 are performed in the sequence indicated at regular intervals, typically either each minute or continuously. If calculations proceed continuously, then it is necessary to determine the time which elapses from one completion to the next in order to determine the rates of change of various values where this is important to the operation. Since temperatures and humidity within an enclosure 12 usually change very slowly, a once per minute calculation usually provides more than adequate accuracy of control.

Block 67 receives a signal encoding the set point dry-bulb temperature for enclosure 12 $T_{dbsp}$ on path 35 and a signal encoding the set point relative humidity for enclosure 12 $\phi_{sp}$ on path 33. The $T_{dbsp}$ value on path 35 and $\phi_{sp}$ on path 33 are utilized in computation block 67 to calculate the sat point apparent temperature $T_{apsp}$ for enclosure 12. As an alternative if the occupant of enclosure 12 inputs the desired apparent temperature, block 67 can be eliminated and the desired apparent temperature value can be supplied on path 84.

Block 61 receives a signal on path 58 encoding a value which represents a weighted average of the wall temperature and the air temperature in enclosure 12 $T_{av}$. Block 61 represents a Laplace transform operation on $T_{av}$ intended to compensate for sensor response lag, and produces a signal on path 64 encoding $T_{dbsn}$. The computation of $T_{dbsn}$ is conventional. The advance which this invention provides is the use of relative humidity and dry bulb temperature to calculate apparent temperature as a further variable for computing the error used for controlling operation of the air conditioning unit 19 shown in FIG. 1. To accomplish this, our preferred apparatus uses a relative humidity value $\phi$ encoded in a signal from sensor 14 supplied on path 30. The $\phi$ value is supplied to a Laplace transform operation block 50 which compensates for the lag and instability in sensor 14, and provides a transformed relative humidity value $\phi_{sn}$ on path 51. The $T_{dbsn}$ value on path 64 and $\phi_{sn}$ on path 51 are utilized in computation block 74 to calculate the sensed apparent temperature $T_{apsn}$ for enclosure 12.

Computation blocks 67 and 74 calculate apparent temperature utilizing Table 1. Table 1 is temperature—humidity scale with apparent temperature (deg. C.) corresponding to each combination of dry bulb temperature and relative humidity. The values in parentheses correspond to skin humidities above 90% and are approximate. This tabulated data is utilized by computation blocks 67 and 74 to calculate both the apparent temperature set point $T_{apsp}$ and the sensed apparent temperature $T_{apsn}$ respectively. For values of dry-bulb temperature and relative humidity that fall in between the values listed in the table, any well known interpolation technique (e.g., linear, quadratic, etc.) can be used for determining the apparent temperature corresponding to the paired dry-bulb temperature and relative humidity. For both computation blocks 67 and 74, temperature and relative humidity are provided by the operator as set points in the case of computation block 67 or by sensors 14 and 15 in the case of computation block 74. The term "computation" is used here in a broad sense to include any sort of data manipulation.

determining apparent temperature contemplated in this invention. In the broad sense it is possible to utilize any two thermodynamic properties from which apparent temperature can be deduced. Examples include wet bulb temperature, dew point temperature and others.

TABLE 1

| Dry Bulb Temperature (deg. C.) | RELATIVE HUMIDITY % | | | | | | | | | | |
|---|---|---|---|---|---|---|---|---|---|---|---|
| | 0 | 10 | 20 | 30 | 40 | 50 | 60 | 70 | 80 | 90 | 100 |
| 20 | 16 | 17 | 17 | 18 | 19 | 19 | 20 | 20 | 21 | 21 | 21 |
| 21 | 18 | 18 | 19 | 19 | 20 | 20 | 21 | 21 | 22 | 22 | 23 |
| 22 | 19 | 19 | 20 | 20 | 21 | 21 | 22 | 22 | 23 | 23 | 24 |
| 23 | 20 | 20 | 21 | 22 | 22 | 23 | 23 | 24 | 24 | 24 | 25 |
| 24 | 21 | 22 | 22 | 23 | 23 | 24 | 24 | 25 | 25 | 26 | 26 |
| 25 | 22 | 23 | 24 | 24 | 24 | 25 | 25 | 26 | 27 | 27 | 28 |
| 26 | 24 | 24 | 25 | 25 | 26 | 26 | 27 | 27 | 28 | 29 | 30 |
| 27 | 25 | 25 | 26 | 26 | 27 | 27 | 28 | 29 | 30 | 31 | 33 |
| 28 | 26 | 26 | 27 | 27 | 28 | 29 | 29 | 31 | 32 | 34 | (36) |
| 29 | 26 | 27 | 27 | 28 | 29 | 30 | 31 | 33 | 35 | 37 | (40) |
| 30 | 27 | 28 | 28 | 29 | 30 | 31 | 33 | 35 | 37 | (40) | (45) |
| 31 | 28 | 29 | 29 | 30 | 31 | 33 | 35 | 37 | 40 | (45) | |
| 32 | 29 | 29 | 30 | 31 | 33 | 35 | 37 | 40 | 44 | (51) | |
| 33 | 29 | 30 | 31 | 33 | 34 | 36 | 39 | 43 | (49) | | |
| 34 | 30 | 31 | 32 | 34 | 36 | 38 | 42 | (47) | | | |
| 35 | 31 | 32 | 33 | 35 | 37 | 40 | (45) | (51) | | | |
| 36 | 32 | 33 | 35 | 37 | 39 | 43 | (49) | | | | |
| 37 | 32 | 34 | 36 | 38 | 41 | 46 | | | | | |
| 38 | 33 | 35 | 37 | 40 | 44 | (49) | | | | | |
| 39 | 34 | 36 | 38 | 41 | 46 | | | | | | |
| 40 | 35 | 37 | 40 | 43 | 49 | | | | | | |
| 41 | 35 | 38 | 41 | 45 | | | | | | | |
| 42 | 36 | 39 | 42 | 47 | | | | | | | |
| 43 | 37 | 40 | 44 | 49 | | | | | | | |
| 44 | 38 | 41 | 45 | 52 | | | | | | | |
| 45 | 38 | 42 | 47 | | | | | | | | |
| 46 | 39 | 43 | 49 | | | | | | | | |
| 47 | 40 | 44 | 51 | | | | | | | | |
| 48 | 41 | 45 | 53 | | | | | | | | |
| 49 | 42 | 47 | | | | | | | | | |
| 50 | 42 | 48 | | | | | | | | | |

Figure 5:
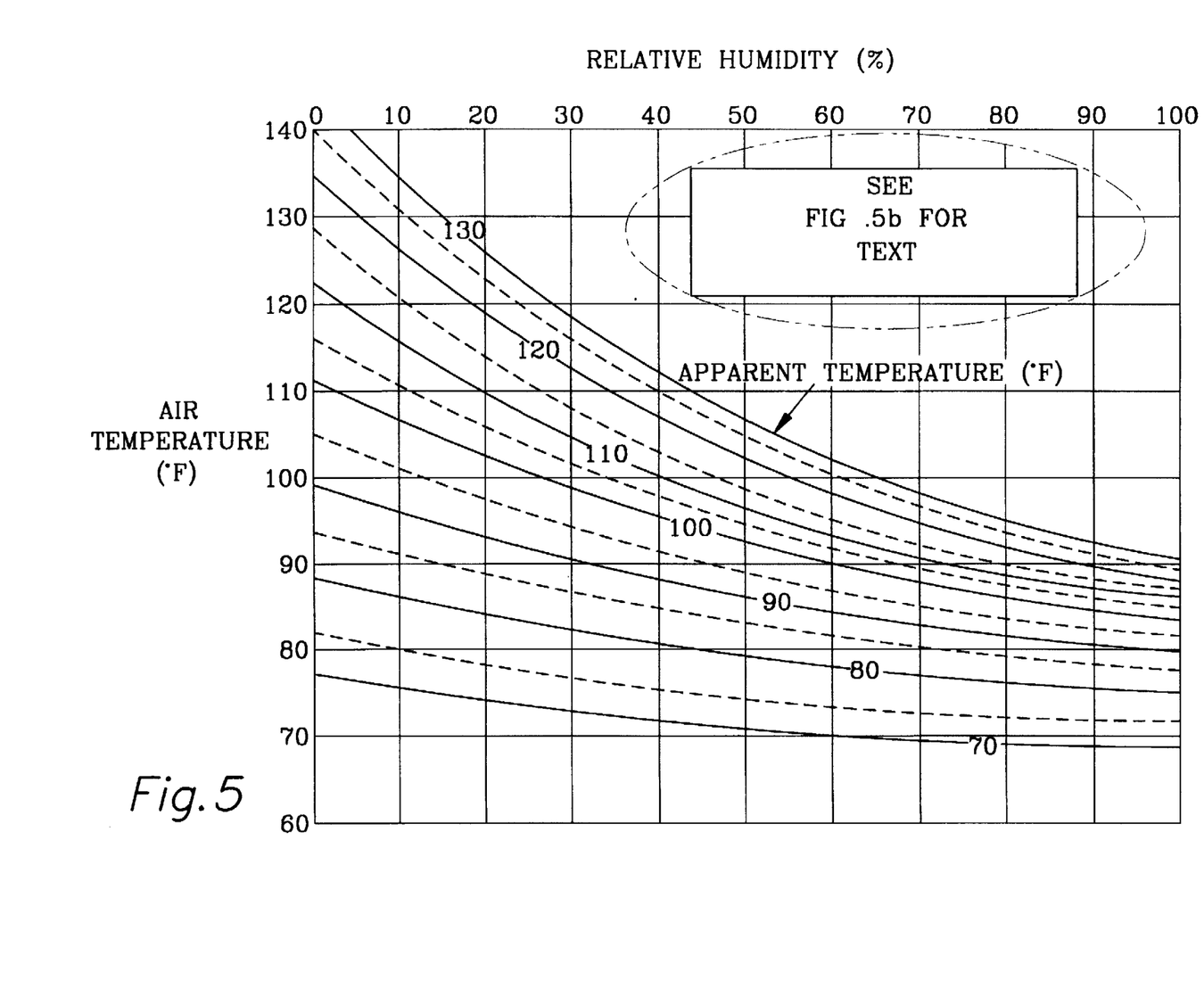
FIG. 5 is a graph illustrating general heat stress indices.
Figure 5B:
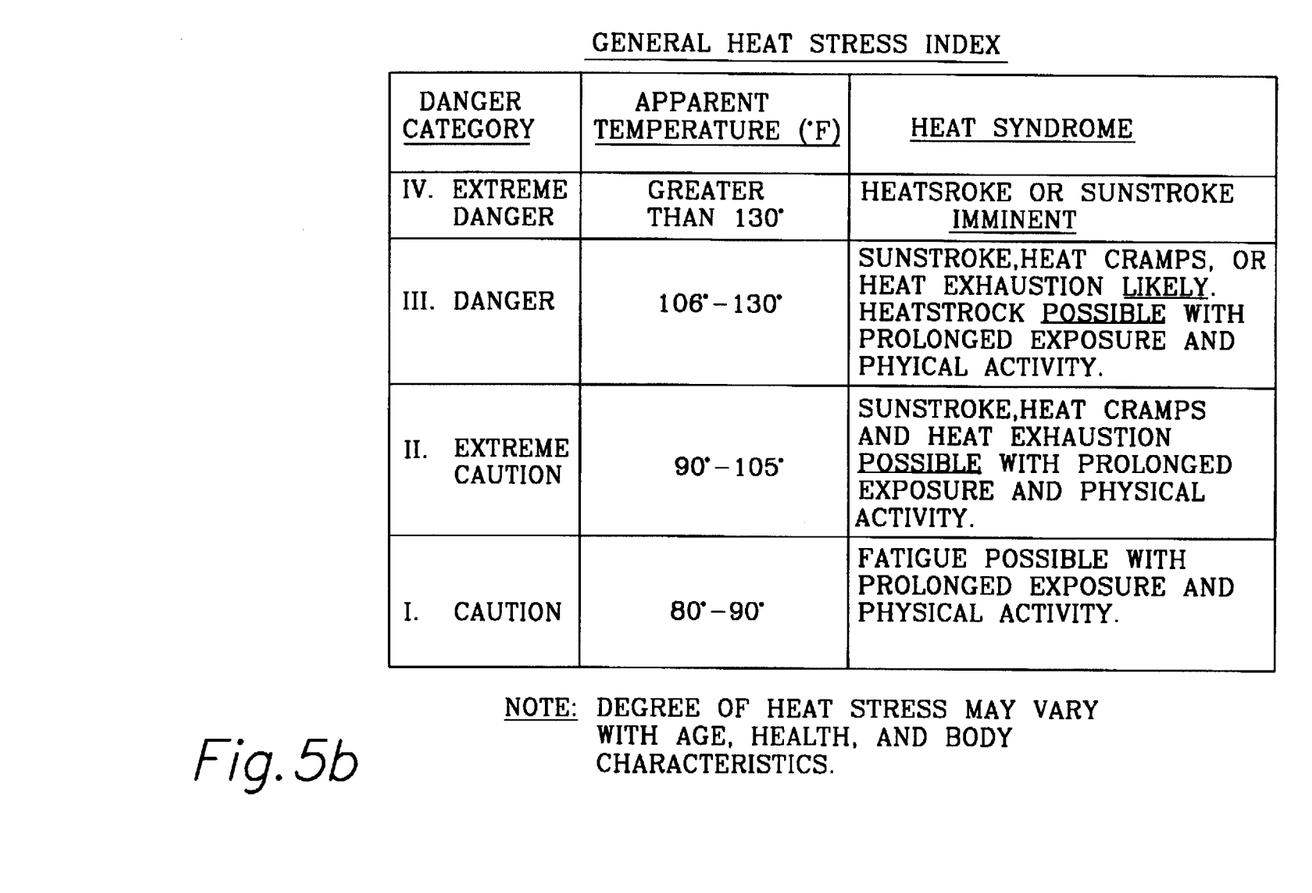

As an alternative to Table 1 for determining the apparent temperature, FIG. 5 can be used as an alternative. Furthermore, a simplified mathematical relationship can be developed by using the data from either Table 1 or FIG. 5, and curve fitting the data for computing the apparent temperature as a function of both the dry-bulb temperature and the relative humidity. The source for FIG. 5 is "Heat Stress—A comparison of Indices"; Quayle, Robert and Doehring, Fred; Weatherwise, Vol. 34, June 1981, pages 120–124.

Although the preferred embodiment incorporates the use of a relative humidity sensor and a temperature sensor to calculate apparent temperature, this is not the only means for Table 2 shows the apparent temperature as a function of both the dry-bulb temperature and the dew-point temperature. In this case the sensed dew-point temperature is either directly measured or derived from measured dry-bulb temperature and relative humidity values, and the dew-point temperature set point is either specified by the user or is calculated from the user specified dry-bulb temperature and relative humidity set point values. Both Tables 1 and 2 are from, "The Assessment of Sultriness. Part 1: A Temperature-Humidity Index Based On Human Physiology and Clothing Science"; Steadman, R. G.; Journal of Applied Meteorology, Vol. 18, No. 7, 1979, pages 861–873.

TABLE 2

| Dry Bulb Temperature (deg. C.) | Dew-point Temperature (deg. C.) | | | | | | | | | | | | | | | |
|---|---|---|---|---|---|---|---|---|---|---|---|---|---|---|---|---|
| | 0 | 2 | 4 | 6 | 8 | 10 | 12 | 14 | 16 | 18 | 20 | 22 | 24 | 26 | 28 | 30 |
| | Vapor Pressure P(kPa) | | | | | | | | | | | | | | | |
| | 0.67 | 0.71 | 0.81 | 0.94 | 1.07 | 1.23 | 1.40 | 1.60 | 1.82 | 2.06 | 2.34 | 2.64 | 2.98 | 3.36 | 3.78 | 4.24 |
| 20 | 18 | 18 | 18 | 19 | 19 | 19 | 20 | 20 | 21 | 21 | 21 | | | | | |
| 22 | 20 | 20 | 21 | 21 | 21 | 22 | 22 | 22 | 22 | 23 | 23 | 24 | | | | |
| 24 | 22 | 23 | 23 | 23 | 23 | 24 | 24 | 24 | 24 | 25 | 25 | 26 | 26 | | | |
| 26 | 24 | 25 | 25 | .25 | 25 | 25 | 26 | 26 | 26 | 27 | 27 | 28 | 29 | 30 | | |
| 28 | 26 | 27 | 27 | 27 | 27 | 27 | 28 | 28 | 29 | 29 | 30 | 31 | 32 | 33 | (36) | |
| 30 | 28 | 28 | 28 | 29 | 29 | 29 | 30 | 30 | 31 | 31 | 32 | 33 | 35 | 36 | 38 | (45) |

TABLE 2-continued

| Dry Bulb Temperature | Dew-point Temperature (deg. C.) | | | | | | | | | | | | | | | |
|---|---|---|---|---|---|---|---|---|---|---|---|---|---|---|---|---|
| | 0 | 2 | 4 | 6 | 8 | 10 | 12 | 14 | 16 | 18 | 20 | 22 | 24 | 26 | 28 | 30 |
| | Vapor Pressure P(kPa) | | | | | | | | | | | | | | | |
| (deg. C.) | 0.67 | 0.71 | 0.81 | 0.94 | 1.07 | 1.23 | 1.40 | 1.60 | 1.82 | 2.06 | 2.34 | 2.64 | 2.98 | 3.36 | 3.78 | 4.24 |
| 32 | 30 | 30 | 30 | 31 | 31 | 31 | 31 | 32 | 33 | 33 | 34 | 36 | 37 | 39 | 41 | (50) |
| 34 | 32 | 32 | 32 | 33 | 33 | 33 | 33 | 34 | 35 | 36 | 37 | 38 | 40 | 42 | 45 | |
| 36 | 33 | 33 | 34 | 34 | 34 | 35 | 35 | 36 | 37 | 38 | 39 | 41 | 43 | 45 | 48 | |
| 38 | 35 | 35 | 35 | 36 | 36 | 37 | 37 | 38 | 39 | 41 | 42 | 44 | 46 | 49 | 52 | |
| 40 | 36 | 37 | 37 | 38 | 38 | 39 | 39 | 40 | 41 | 43 | 45 | 47 | 49 | 52 | | |
| 42 | 38 | 38 | 39 | 39 | 40 | 40 | 41 | 42 | 43 | 45 | 47 | 49 | 52 | | | |
| 44 | 40 | 40 | 41 | 41 | 42 | 42 | 43 | 44 | 45 | 47 | 49 | 52 | | | | |
| 46 | 42 | 42 | 42 | 43 | 44 | 44 | 45 | 46 | 47 | 49 | 51 | | | | | |
| 48 | 43 | 44 | 44 | 45 | 45 | 45 | 46 | 48 | 49 | 51 | | | | | | |
| 50 | 45 | 45 | 46 | 46 | 48 | 50 | 52 | | | | | | | | | |

The apparent temperature set point value, $T_{apsp}$, is supplied by computation block 67 or memory 27, when specified by the occupant, on path 84 to summation element 71. The sensed apparent temperature value, $T_{apsn}$, is provided by computation block 74 on path 81 to summation element 71 and subtracted from $T_{apsp}$. The result is the apparent temperature error, $\epsilon_{ap}$.

It is not preferred to use the apparent temperature error value $\epsilon_{ap}$ directly for deriving a demand signal. Instead $\epsilon_{ap}$ is provided to a conventional PID (proportional, integral, derivative) control function comprising the $G_p$, $G_i$/s and $G_d$s blocks 91–93 whose output values are then summed by a summing block 96 (also a part of the PID control function) to produce a final error value $\epsilon_f$ encoded in a final error signal on path 98.

The final error value $\epsilon_f$ carried on path 98 is converted to the demand signal on path 26. $\epsilon_f$ is preferably modified through a number of computational stages according to known practice to insert an anticipation function in deriving the final demand signal on path 26. Each stage of the demand signal computation produces a signal having a logical 1, which can be thought of as corresponding to the ON condition of air conditioning unit 19. The signal voltage on path 26 has a level corresponding to a logical 0 when the demand signal is not present. When a logical 1 is present on path 26, then switch 29 (see FIG. 1) is closed and current flows to air conditioning unit 19. When path 26 carries a logical 0 value, switch 29 is open and unit 19 does not operate.

The anticipation function is implemented in a conventional manner by the summing block 101 and functional blocks 103 and 113. Block 113 applies a Laplace transform operation in a known manner to the signal carried on path 26, shifting its logical 0 and 1 values in time. Hysteresis in test block 103 provides a first stage demand signal on path 26. If the Laplace transform block 113 returns a value of 0 on path 115 to summing block 101, then the final error value $\epsilon_f$ on path 98 is used by the hysteresis test block 103 to determine the times and lengths of the first stage of the demand signal on path 26. If block 113 returns a value different from zero to summing block 101 then the error value $\epsilon_f$ on path 98 supplied to test block 103 is reduced by summation blocks 101, which will delay the starts of the demand signal and shorten its interval length, thereby delaying startup and speeding up shutdown times of air conditioning unit 19.

Figure 3:
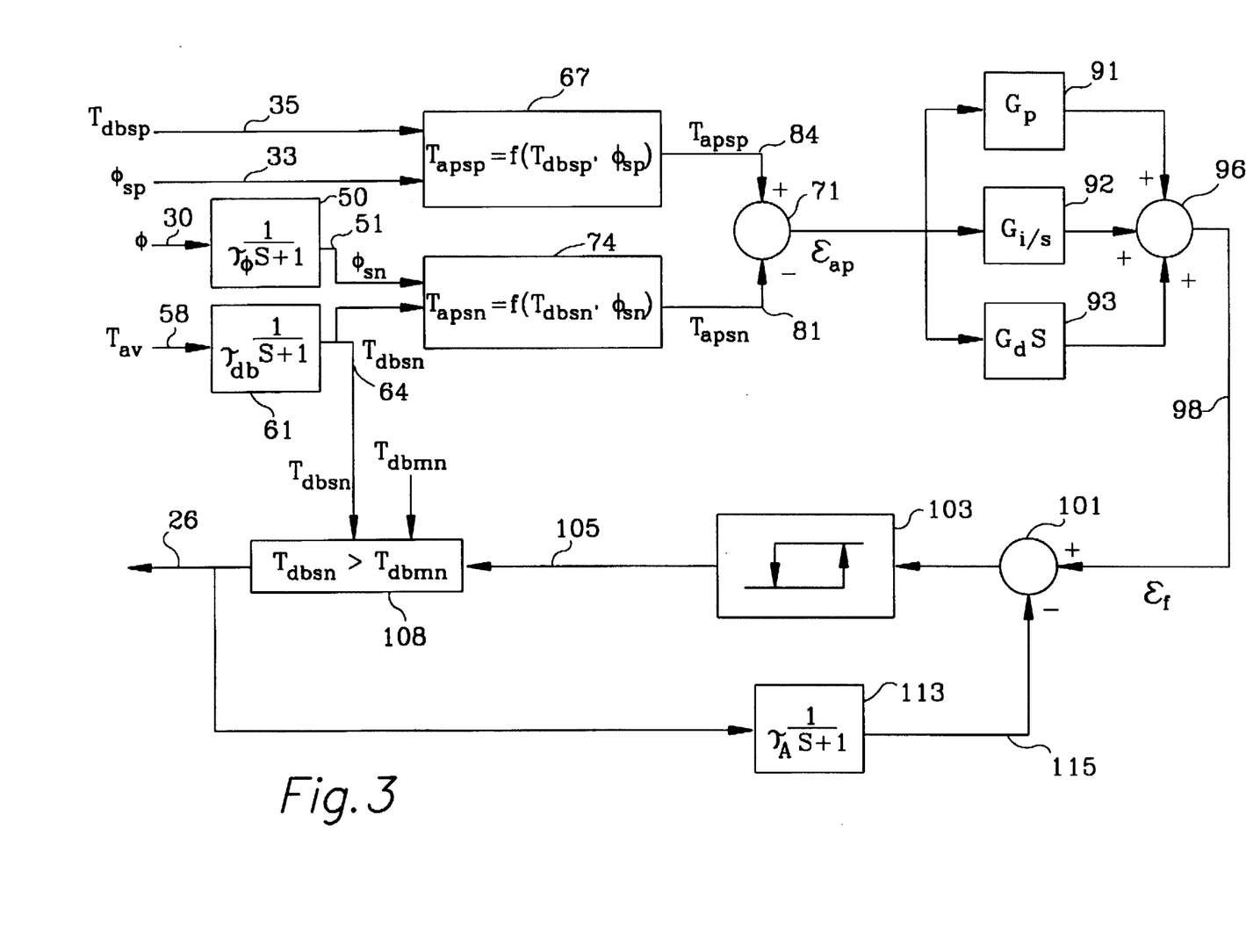
FIG. 3 is a computation diagram specifying a second embodiment of the algorithm implemented by a controller for a climate control system.

An optional feature, illustrated in FIG. 3, is test block 108 which receives the first stage of the demand signal on path 105. In certain rare situations of extremely high humidity or poorly sized air conditioning units, or where a relatively low value for $\phi_{sp}$ is selected, it is possible that an uncomfortably low value of sensed dry-bulb temperature $T_{dbsn}$ may result. To deal with this potential problem test block 108 receives the $T_{dbmn}$ value on path 64 and the $T_{dbmn}$ value on path 34. $T_{dbmn}$ is used as a limit dry-bulb temperature for halting operation of the air conditioning unit. If the condition $T_{dbmn} > T_{dbsn}$ arises, then regardless of the actual apparent temperature in enclosure 12, the final demand signal on path 26 is dropped so as to cause air conditioning unit 19 to shut off before the apparent temperature error $\epsilon_{ap}$ is reduced to the level producing a value of $\epsilon_{ap}$ which normally would cause this.

Figure 4:
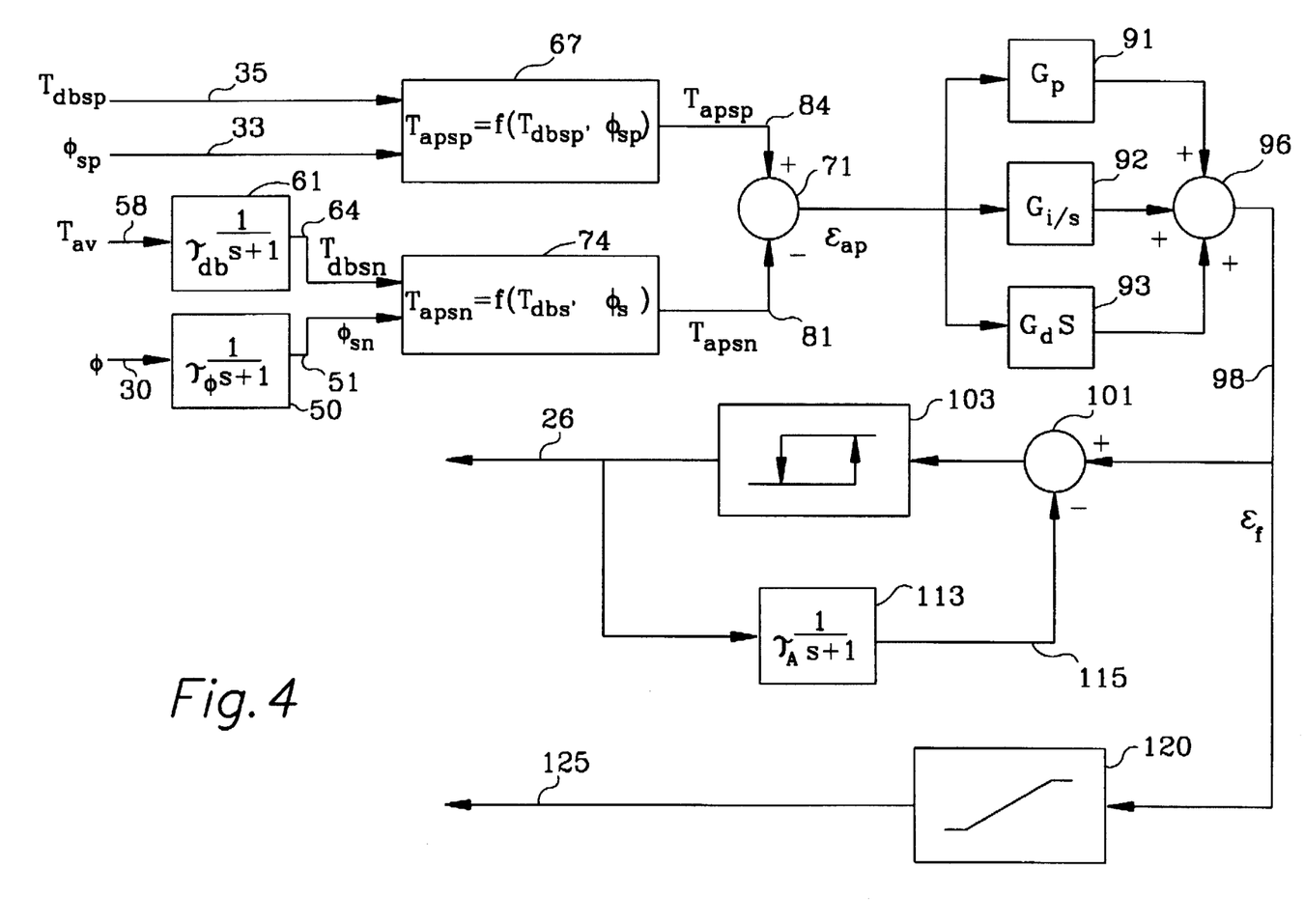
FIG. 4 is a computation diagram specifying a preferred embodiment of the algorithm implemented by a controller for a climate control system having 2 stage cooling means.

A third embodiment of the invention incorporates the use of a variable speed (capacity) compressor in an air conditioner or a heat pump to provide different mounts of cooling to the enclosure as a function of how fast the compressor is running in response to an appropriate signal from a controller such as a thermostat. A variable speed control is disclosed in U.S. Pat. No. 5,314,004 and in U.S. Pat. No. 5,309,730 both of which are hereby incorporated by reference. The embodiment disclosed in FIG. 4 is similar to that of FIG. 2 with one addition. $\epsilon_f$ on path 98 is also provided to variable speed control 120. Variable speed control 120 provides a control signal on path 125 to the variable speed compressor control.

I claim:

1. Apparatus for cooperating with a controller for a climate control system for modifying the temperature and moisture content of air within an enclosure, said controller activating the climate control system responsive to an apparent temperature error value encoded in an apparent temperature error signal, said apparatus comprising:

a) a relative humidity sensor providing a relative humidity signal encoding the relative humidity value;

b) a temperature sensor providing an air temperature signal encoding the dry-bulb temperature value;

c) a memory recording a set point signal encoding an apparent temperature set point value;

d) error computation means receiving the humidity and air temperature signals and the set point signal, for computing the apparent temperature error value as a function of the values encoded in the humidity and air temperature signals and the set point signal, and for encoding the apparent temperature error value in the apparent temperature error signal; and e) wherein the memory further comprises means for storing a limit dry-bulb temperature value and for providing a signal encoding the limit dry-bulb temperature value in a limit temperature signal, and wherein the error computation means further comprises comparison means receiving the limit temperature signal and the air temperature signal, for comparing the limit temperature signal with the value encoded in the air temperature signal, and for suppressing the demand signal responsive to a predetermined relationship between the limit dry-bulb temperature value and the dry-bulb temperature value.

2. The apparatus of claim 1, wherein the error computation means further comprises computing means for forming an apparent temperature value based on the relative humidity value and the dry-bulb temperature value, and for computing the apparent temperature error value equal to the difference between the apparent temperature set point value and the apparent temperature value.

3. The apparatus of claim 2 further comprising an error processing means receiving the apparent temperature error signal for providing a demand signal during intervals determined as a function of the apparent temperature error value.

4. The apparatus of claim 1 intended for controlling operation of a climate control system having a mechanical cooling function.

5. The apparatus of claim 4 further comprising a variable capacity cooling means.

6. The apparatus of claim 4 further comprising a multistage cooling means.

7. The apparatus of claim 4 further comprising a fan coil cooling means.

8. Apparatus for cooperating with a controller for a climate control system for modifying the temperature and moisture content of air within an enclosure, said controller activating the climate control system responsive to an apparent temperature error value encoded in an apparent temperature error signal, said apparatus comprising:
 a) an apparent temperature sensor providing a sensed apparent temperature signal encoding the sensed apparent temperature value;
 b) a memory recording an apparent temperature set point value and providing an apparent temperature set point signal encoding the apparent temperature set point value;
 c) error computation means receiving the sensed apparent temperature signal and the apparent temperature set point signal, for computing the apparent temperature error value as a function of the values encoded in the sensed apparent temperature signal and the apparent temperature set point signal, and for encoding the apparent temperature error value in the apparent temperature error signal; and
 d) wherein the memory further comprises means for storing a limit dry-bulb temperature value and for providing a signal encoding the limit dry-bulb temperature value in a limit temperature signal, and wherein the error computation means further comprises comparison means receiving the limit temperature signal and an air temperature signal, for comparing the limit temperature signal with the value encoded in an air temperature signal, and for suppressing the demand signal responsive to a predetermined relationship between the limit dry-bulb temperature value and the dry-bulb temperature value.

9. The apparatus of claim 8 wherein said memory means further comprises means for recording a dry-bulb temperature set point value and a relative humidity set point value, and wherein computation means calculates the apparent temperature set point signal encoding the apparent temperature set point values, as a function of the dry-bulb temperature set point value and the relative humidity set point value.

10. The apparatus of claim 9 wherein error computation means further comprises means for sensing the enclosure dry-bulb temperature and relative humidity and means for computing the sensed apparent temperature encoding the sensed apparent temperature value as a function of the sensed dry-bulb temperature and relative humidity values.

11. Apparatus for cooperating with a controller for a climate control system for modifying the temperature and moisture content of air within an enclosure, said controller activating the climate control system responsive to an apparent temperature error value encoded in an apparent temperature error signal, said apparatus comprising:
 a) a means for determining the space apparent temperature by sensing any two thermodynamic properties of the moist air within the enclosure and providing a sensed apparent temperature signal encoding the sensed apparent temperature value;
 b) a memory recording set point values for any two thermodynamic properties of the moist air from which can be deduced an apparent temperature set point value and providing an apparent temperature set point signal encoding the apparent temperature set point value;
 c) error computation means receiving the sensed apparent temperature signal and the apparent temperature set point signal, for computing the apparent temperature error value as a function of the values encoded in the sensed apparent temperature signal and the apparent temperature set point signal, and for encoding the apparent temperature error value in the apparent temperature error signal; and
 d) wherein the memory further comprises means for storing a limit dry-bulb temperature value and for providing a signal encoding the limit dry-bulb temperature value in a limit temperature signal, and wherein the error computation means further comprises comparison means receiving the limit temperature signal and at least one of said thermodynamic properties indicative of an air temperature signal, for comparing the limit temperature signal with the value encoded in the air temperature signal, and for suppressing the demand signal responsive to a predetermined relationship between the limit dry-bulb temperature value and the dry-bulb temperature value.

12. The apparatus of claim 11, wherein the error computation means further comprises computing means for computing the apparent temperature error value equal to the difference between the apparent temperature set point value and the apparent temperature value.

13. The apparatus of claim 12 further comprising an error processing means receiving the apparent temperature error signal for providing a demand signal during intervals determined as a function of the apparent temperature error value.

14. The apparatus of claim 13 intended for controlling operation of a climate control system having a mechanical cooling function.

15. The apparatus of claim 14 further comprising a variable capacity cooling means.

16. The apparatus of claim 14 further comprising a multi-stage cooling means.

17. The apparatus of claim 14 further comprising a fan coil cooling means.

18. Apparatus for cooperating with a controller for a climate control system for modifying the temperature and moisture content of air within an enclosure, said controller activating the climate control system responsive to an apparent temperature error value encoded in an apparent temperature error signal, said apparatus comprising:

a) a means for determining the space apparent temperature by sensing any two thermodynamic properties of the moist air within the enclosure and providing a sensed apparent temperature signal encoding the sensed apparent temperature value;

b) a memory recording an apparent temperature set point value and providing an apparent temperature set point signal encoding the apparent temperature set point value;

c) error computation means receiving the sensed apparent temperature signal and the apparent temperature set point signal, for computing the apparent temperature error value as a function of the values encoded in the sensed apparent temperature signal and the apparent temperature set point signal, and for encoding the apparent temperature error value in the apparent temperature error signal; and d) wherein the memory further comprises means for storing a limit dry-bulb temperature value and for providing a signal encoding the limit dry-bulb temperature value in a limit temperature signal, and wherein the error computation means further comprises comparison means receiving the limit temperature signal and at least one of said thermodynamic properties indicative of an air temperature signal, for comparing the limit temperature signal with the value encoded in the air temperature signal, and for suppressing the demand signal responsive to a predetermined relationship between the limit dry-bulb temperature value and the dry-bulb temperature value.

19. The apparatus of claim 18, wherein the error computation means further comprises computing means for computing the apparent temperature error value equal to the difference between the apparent temperature set point value and the apparent temperature value.

20. The apparatus of claim 19 further comprising an error processing means receiving the apparent temperature error signal for providing a demand signal during intervals determined as a function of the apparent temperature error value.

21. The apparatus of claim 20 intended for controlling operation of a climate control system having a mechanical cooling function.

22. The apparatus of claim 21 further comprising a variable capacity cooling means.

23. The apparatus of claim 21 further comprising a multi-stage cooling means.

24. The apparatus of claim 21 further comprising a fan coil cooling means.

* * * * *